United States Patent
Takeda et al.

(10) Patent No.: US 6,931,945 B2
(45) Date of Patent: Aug. 23, 2005

(54) DOPPLER ULTRASONIC FLOWMETER

(75) Inventors: Yasushi Takeda, 12-21, Kita 8-Jo Nishi 5-chome, Kita-Ku, Sapporo-shi, Hokkaido (JP), 060-0808; Michitsugu Mori, Tokyo (JP)

(73) Assignees: The Tokyo Electric Power Company, Incorporated, Tokyo (JP); Yasushi Takeda, Sapporo (JP)

(*) Notice: Subject to any disclaimer, the term of this patent is extended or adjusted under 35 U.S.C. 154(b) by 0 days.

(21) Appl. No.: 10/493,480

(22) PCT Filed: Oct. 25, 2002

(86) PCT No.: PCT/JP02/11116

§ 371 (c)(1),
(2), (4) Date: Sep. 20, 2004

(87) PCT Pub. No.: WO03/036241

PCT Pub. Date: May 1, 2003

(65) Prior Publication Data

US 2005/0011279 A1 Jan. 20, 2005

(30) Foreign Application Priority Data

Oct. 26, 2001 (JP) .................................... 2001-329654

(51) Int. Cl.⁷ .............................................. G01F 1/66
(52) U.S. Cl. .............................. 73/861.25; 73/861.27; 702/54
(58) Field of Search ................... 73/861.25–861.31, 73/45, 50, 54; 702/75, 100, 103, 106, 189; 367/87, 137

(56) References Cited

U.S. PATENT DOCUMENTS 4,484,478 A * 11/1984 Harkonen ................ 73/861.06
5,540,230 A * 7/1996 Vilkomerson ............... 600/454
6,067,861 A   5/2000 Shekarriz et al.

FOREIGN PATENT DOCUMENTS

| JP | 8-233624 | 9/1996 |
| JP | 2000-97742 | 4/2000 |

* cited by examiner

Primary Examiner—Harshad Patel
Assistant Examiner—Corey D. Mack
(74) Attorney, Agent, or Firm—Oblon, Spivak, McClelland, Maier & Neustadt, P.C.

(57) ABSTRACT

A Doppler type ultrasonic flowmeter has an ultrasonic transmitting means for emitting ultrasonic pulses from an ultrasonic transducer into a fluid pipe, a flow velocity profile measuring means for receiving an ultrasonic echo reflected from a measurement region in the fluid pipe thereby to measure a flow velocity profile of a fluid to be measured, a fluid flow rate computing means for calculating the flow rate thereof on the basis of the flow velocity profile of the fluid to be measured, and a frequency selecting and setting means for automatically selecting a fundamental frequency of an ultrasonic wave that causes a resonant transmission phenomenon to take place from the ultrasonic transducer. The frequency selecting and setting means controls the operation of the ultrasonic transmitting means such that an ultrasonic wave of a selected optimum frequency is emitted from the ultrasonic transducer. This arrangement makes it possible to provide a highly versatile Doppler type ultrasonic flowmeter that permits simple, easy, contactless, precise and highly accurate measurement of the flow rates of fluids to be measured that are flowing in various fluid pipes.

8 Claims, 7 Drawing Sheets

DOPPLER ULTRASONIC FLOWMETER

TECHNICAL FIELD

The present invention relates to a Doppler type ultrasonic flowmeter for measuring a flow rate of a fluid to be measured by utilizing an ultrasonic Doppler shift and, more particularly, to a Doppler type ultrasonic flowmeter that permits automatic adjustment and setting of optimum frequencies and optimum incident angles of ultrasonic waves.

BACKGROUND ART

Flowmeters for measuring flow velocities and flow rates of fluids to be measured that are passing in fluid pipes are roughly divided into two types according to measurement principles.

A first type of flowmeters measures flow rates by making use of the fact that the processing amount of a fluid flowing through a fluid pipe changes, depending upon flowing direction. As this type of flowmeter, there is an orifice flowmeter. The orifice flowmeter measures flow rates by utilizing the fact that fluid pressure on upstream side of an orifice differs from that on the downstream side. This flow rate measuring method will be hereinafter referred to as "average value approximation."

The second type of flowmeters is used for measuring flow rates of flows primarily in round pipes.

This type of flowmeters is adapted to measure a flow velocity at one point in the flow in a pipe, e.g., at a predetermined point on a pipe axis, and then a flow velocity profile configuration in the pipe is presumed from a theoretical value based on the obtained measurement value. The flow velocity profile configuration is integrated to determine a flow rate. This flow rate measurement method will be hereinafter referred to as "approximate integration."

Meanwhile, some flowmeters are known as ultrasonic flowmeters for measuring the flow rates of fluids by applying ultrasonic waves to fluids to be measured.

Such ultrasonic flowmeters are roughly divided into a type adapted to measure the flow rates by the average value approximation method and a type adapted to measure the flow rates by the approximate integration.

The ultrasonic flowmeters employing the average value approximation measure the flow rates by determining an average velocity between two predetermined points by utilizing the fact that the time required for an ultrasonic pulse to travel between the two predetermined points differs by the flow velocity of a fluid, depending on whether the ultrasonic pulse advances towards the upstream side of the flow of the fluid or conversely towards the downstream side of the flow.

The ultrasonic flowmeters employing the approximate integration determines the velocity of a fluid to be measured at one point on the central axis of a pipe by utilizing the Doppler shift method thereby to measure the flow rate thereof on the basis of the determined velocity of the fluid, one of which has been disclosed in Japanese Patent Laid-open Publication No. HEI 6-294670. The ultrasonic flowmeter based on the approximate integration determines a flow velocity profile configuration from a theoretical value or an empirical rule and then performs integration. For instance, flow velocity profile in a laminar flow region in a pipe is represented by a parabola, so that the flow rates can be determined by using a fluid velocity measured on its central axis by using boundary conditions on a pipe wall. Strictly speaking, this theoretical solution applies to a flow in a steady state, and therefore, the ultrasonic flowmeter based on the approximate integration can be applied only to a flow of a steady state and cannot be used for the flow in non-steady state.

In general, the flow of a viscous fluid is widely known to be represented by Navier-Stokes equation (hereinafter referred to as "NS equation"). A conventional ultrasonic flowmeter determines flow rates by utilizing the knowledge of flow distribution with respect to a steady state, ignoring time derivative term of an NS equation. For this reason, if an object to be measured is a flow field (the flow field of a fluid) where the approximate integration does not hold due to time-dependent changes in the flow rate, then measurement accuracy may be significantly deteriorated or validity of measurement results may be damaged.

Such flow fields include, for example, a flow field in which a change time of a flow rate system is shorter than the time required for determining an average flow rate, or a flow field in which a flow has not yet fully developed. In the former case, the time derivative term of the NS equation does not reach zero, while in the latter case, one-dimensional approximation of the NS equation does not hold.

The conventional flowmeters are for performing flow rate measurement in steady states, so that measuring flow rates with sufficient accuracy requires, for example, an extremely long runway for stabilizing a flow on the upstream side of a measurement location. This requires time, cost and labor to provide piping. In addition, since the flowmeters are for measuring flow rates of flows in steady states, it has been difficult to measure flow rates of flows in non-steady states.

Furthermore, the conventional flowmeters are adapted to measure an average flow rate of a fluid passing in a closed pipe, such as a round pipe, making it impossible to measure local flow rates of larger flow systems. For instance, none of the flowmeters have been able to measure characteristic flow rates that vary with time in the vicinity of an inlet or outlet of a huge agitating tank.

The flow of a fluid to be measured in a flow field of a three-dimensional space is represented by a three-dimensional vector amount, while a conventional flowmeter measures a flow rate, presuming a one-dimensional flow in a pipe. For this reason, even in a closed pipe, if a flow is three-dimensional, then flow rate measurement accuracy extremely deteriorates or the measurement becomes impossible. For example, immediately following a bent pipe, such as an elbow pipe or a U-shaped inversion pipe, the flow of a fluid turns to be three-dimensional due to a centrifugal action. The conventional flowmeter installed at such a location will not be able to perform accurate flow measurement.

The present inventors have proposed, in the description of Japanese Patent Application No. HEI 10-272359, a Doppler type ultrasonic flowmeter that utilizes ultrasonic Doppler shifts, and permits precise, time-dependent, contactless measurement of flow rates even if fluids to be measured are in non-steady states.

The Doppler type ultrasonic flowmeter adopts a technique to thereby directly calculate the flow rate from an instantaneous flow velocity profile of the fluid to be measured in the fluid pipe, and it has been found to present high accuracy and responsiveness in measuring the flow rates of fluids to be measured.

The conventional Doppler type ultrasonic flowmeters are also required to permit measurement of flow rates of fluids to be measured in fluid pipes with ease and great versatility.

In order to smoothly measure the flow velocities of fluids to be measured in various types of fluid pipes by Doppler type ultrasonic flowmeters, it is necessary to secure sufficient ultrasonic transmission efficiency and to secure sufficient reflected wave S/N ratios for fluid pipes having various pipe wall thicknesses.

In the conventional Doppler type ultrasonic flowmeters, the ultrasonic transmission characteristics of a metal wall of the fluid pipe are checked by changing the thickness of the metal wall so as to set an optimum thickness of the fluid pipe.

However, application of the Doppler type ultrasonic flowmeters to an actual equipment makes it impossible to change the thickness of fluid pipes, and ultrasonic flowmeters having optimum ultrasonic transmission characteristics for each type of the fluid pipes must be prepared, exhibiting poor versatility.

The present invention has been made, considering the circumstances described above, and it is a primary object of the present invention to provide a highly versatile Doppler type ultrasonic flowmeter that permits simple, easy, contactless and accurate measurement of flow rates of fluids to be measured in various fluid pipes.

Another object of the present invention is to provide a Doppler type ultrasonic flowmeter that automatically selects an optimum ultrasonic frequency or an optimum ultrasonic incident angle that causes a resonant transmission phenomenon to take place with respect to various wall thicknesses of fluid pipes so as to permit precise and accurate measurement of flow rates of fluids to be measured by utilizing ultrasonic Doppler shifts.

A further object of the present invention is to provide a Doppler type ultrasonic flowmeter that permits accurate and precise measurement of flow rates even of opaque or translucent fluids to which optical flow rate measurement methods cannot be applied.

A still further object of the present invention is to provide a Doppler type ultrasonic flowmeter that permits precise and accurate measurement of fluids to be measured in fluid pipes even if swirling flows or flows not parallel to pipes are produced in fluid pipes.

DISCLOSURE OF THE INVENTION

The objects of the present invention described above can be achieved by providing a Doppler type ultrasonic flowmeter comprising an ultrasonic transmitting means provided with an ultrasonic transducer for emitting an ultrasonic pulse and adapted to direct the ultrasonic pulses from an ultrasonic transducer into a fluid to be measured that is flowing in a fluid pipe, a flow velocity profile measuring means for receiving an ultrasonic echo of the ultrasonic pulse led into the fluid to be measured, the ultrasonic echo being reflected from a measurement region in the fluid pipe, and measuring a flow velocity profile of the fluid to be measured in the measurement region, a fluid flow rate computing means for calculating the flow rate of the fluid to be measured on the basis of the flow velocity profile of the fluid to be measured, and a frequency selecting and setting means for automatically selecting a fundamental frequency of an ultrasonic wave from the ultrasonic transducer that causes a resonant transmission phenomenon to take place with respect to the pipe wall of the fluid pipe, wherein the frequency selecting and setting means controls the operation of the ultrasonic transmitting means so that an ultrasonic wave of a selected optimum frequency is emitted from the ultrasonic transducer.

In order to solve the problems described above, in a preferred embodiment of the Doppler type ultrasonic flowmeter according to the present invention, the oscillation frequency selecting and setting means automatically adjusts and sets the oscillation frequency of an ultrasonic pulse emitted from the ultrasonic transducer so that an integral multiple of an ultrasonic half-wave length is equal to the wall thickness of the fluid pipe. The oscillation frequency selecting and setting means comprises an oscillation amplifier for emitting an ultrasonic wave of a required oscillation frequency from the ultrasonic transducer, an oscillation frequency changing device for variably adjusting and setting an oscillation frequency of the oscillation amplifier, a frequency domain setting means for operating the oscillation frequency changing device in a frequency domain designated beforehand, an ultrasonic receiving means for receiving an ultrasonic echo of the ultrasonic pulse emitted from the ultrasonic transducer that is reflected from the measurement region in the fluid pipe, and a reflected wave intensity extracting means for extracting and storing the intensity of the received ultrasonic echo, wherein the oscillation frequency selecting and setting means repeats an operation of extracting and selecting oscillation frequencies to automatically select an optimum ultrasonic frequency.

The Doppler type ultrasonic flowmeter further comprises an incident angle adjusting and setting means for adjusting and setting an incident angle of an ultrasonic pulse emitted from the ultrasonic transducer into the fluid to be measured, wherein the incident angle adjusting and setting means has the ultrasonic transducer provided on the fluid pipe so as to be adjusted and set to provide the ultrasonic pulse with an incident angle that causes the resonant transmission phenomenon to take place with respect to the pipe wall of the fluid pipe, the frequency selecting and setting means and the incident angle adjusting and setting means being combined.

Furthermore, in order to achieve the above objects, there is provided a Doppler type ultrasonic flowmeter in accordance with the present invention, which comprises an ultrasonic transmitting means provided with an ultrasonic transducer for emitting ultrasonic pulses from an ultrasonic transducer into a fluid to be measured that is flowing in a fluid pipe, a flow velocity profile measuring means for receiving an ultrasonic echo of the ultrasonic pulse led into the fluid to be measured that is reflected from the measurement region in the fluid pipe, and measuring a flow velocity profile of the fluid to be measured in the measurement region, a fluid flow rate computing means for calculating the flow rate of the fluid to be measured on the basis of the flow velocity profile of the fluid to be measured, and an incident angle adjusting and setting means for adjusting and setting the incident angle of an ultrasonic pulse emitted from the ultrasonic transducer into the fluid to be measured, wherein the incident angle adjusting and setting means has the ultrasonic transducer provided on the fluid pipe such that it can be adjusted and set so as to provide the ultrasonic pulse with an incident angle that causes the resonant transmission phenomenon to take place with respect to the pipe wall of the fluid pipe.

Furthermore, the incident angle adjusting means may be equipped with an ultrasonic transducer provided on the fluid pipe from outside, an incident angle changing mechanism that permits adjustment and setting of the incident angle of an ultrasonic pulse emitted from the ultrasonic transducer, an incident angle range setting means for actuating the incident angle changing mechanism within the range of an incident angle range designated beforehand, and a reflected wave intensity extracting means for receiving the ultrasonic echo of the ultrasonic wave emitted from the ultrasonic transducer that is reflected from the measurement region in the fluid pipe and extracting and storing the intensity of the ultrasonic echo, wherein the incident angle adjusting and setting means may repeatedly perform an operation for extracting and selecting ultrasonic pulse incident angles to automatically select an optimum ultrasonic pulse incident angle. The ultrasonic transducer may be provided on the outer side of the fluid pipe such that the mounting angle thereof can be adjusted, and the mounting angle of the ultrasonic transducer may be selected by the incident angle changing mechanism so as to adjust and set the incident angle of an ultrasonic pulse emitted from the ultrasonic transducer.

Furthermore, in order to achieve the above objects, the Doppler type ultrasonic flowmeter according to the present invention comprises a first ultrasonic transducer provided on a fluid pipe, a second ultrasonic transducer provided apart from the first ultrasonic transducer in the axial direction of the fluid pipe, an ultrasonic transducer moving mechanism for relatively moving the first ultrasonic transducer forward or backward with respect to the second ultrasonic transducer, the two ultrasonic transducers being disposed such that emitted ultrasonic pulses are orthogonalized in a measurement region in the fluid pipe, reflected wave receivers for receiving ultrasonic echoes, which are reflected waves of the ultrasonic pulses emitted from the first and second ultrasonic transducers, respectively, from a measurement region in the fluid pipe, velocity vector calculating means for calculating velocity vectors in an ultrasonic measurement line direction from the intensity of the ultrasonic echoes received by the reflected wave receivers, and a flow velocity vector calculating means for calculating a flow velocity vector of a fluid to be measured from a vector sum of the velocity vectors calculated by the velocity vector calculating means, wherein the flow rate of the fluid to be measured is calculated from the flow velocity profile in the measurement line direction in the fluid pipe calculated by the flow velocity vector calculating means.

As described above, the Doppler type ultrasonic flowmeter according to the present invention is provided with the frequency selecting and setting means for automatically selecting and setting oscillation frequencies of ultrasonic pulses emitted from an ultrasonic transducer, and the incident angle adjusting and setting means for selectably setting the incident angles of ultrasonic pulses emitted from the ultrasonic transducer to optimum angles. According to this arrangement, it is possible to automatically set optimum frequencies or optimum incident angles of ultrasonic waves that cause the resonant transmission phenomenon to take place with respect to the wall thickness of a fluid pipe. This obviates the need for providing an ultrasonic transducer that is best suited to each type of fluid pipe. Thus, the Doppler type ultrasonic flowmeter is highly versatile and permits simple, easy, precise and highly accurate, contactless measurement of the flow rate of a fluid to be measured that is flowing in the fluid pipe.

The Doppler type ultrasonic flowmeter in accordance with the present invention permits precise and highly accurate measurement of flow rates fluids to be measured by utilizing ultrasonic Doppler shifts and also permits precise and highly accurate measurement even of opaque or translucent fluids, which cannot be measured by optical flow rate measuring means, or fluids having swirls, vortexes or non-parallel flow in a fluid pipe.

Furthermore, the above and other constructions and features of the present invention will be clearly understood from the following description of embodiments given with reference to the accompanying drawings.

BEST MODE FOR EMBODYING THE INVENTION

Embodiments of the Doppler type ultrasonic flowmeter in accordance with the present invention will be explained hereunder with reference to the accompanying drawings.

Figure 1:
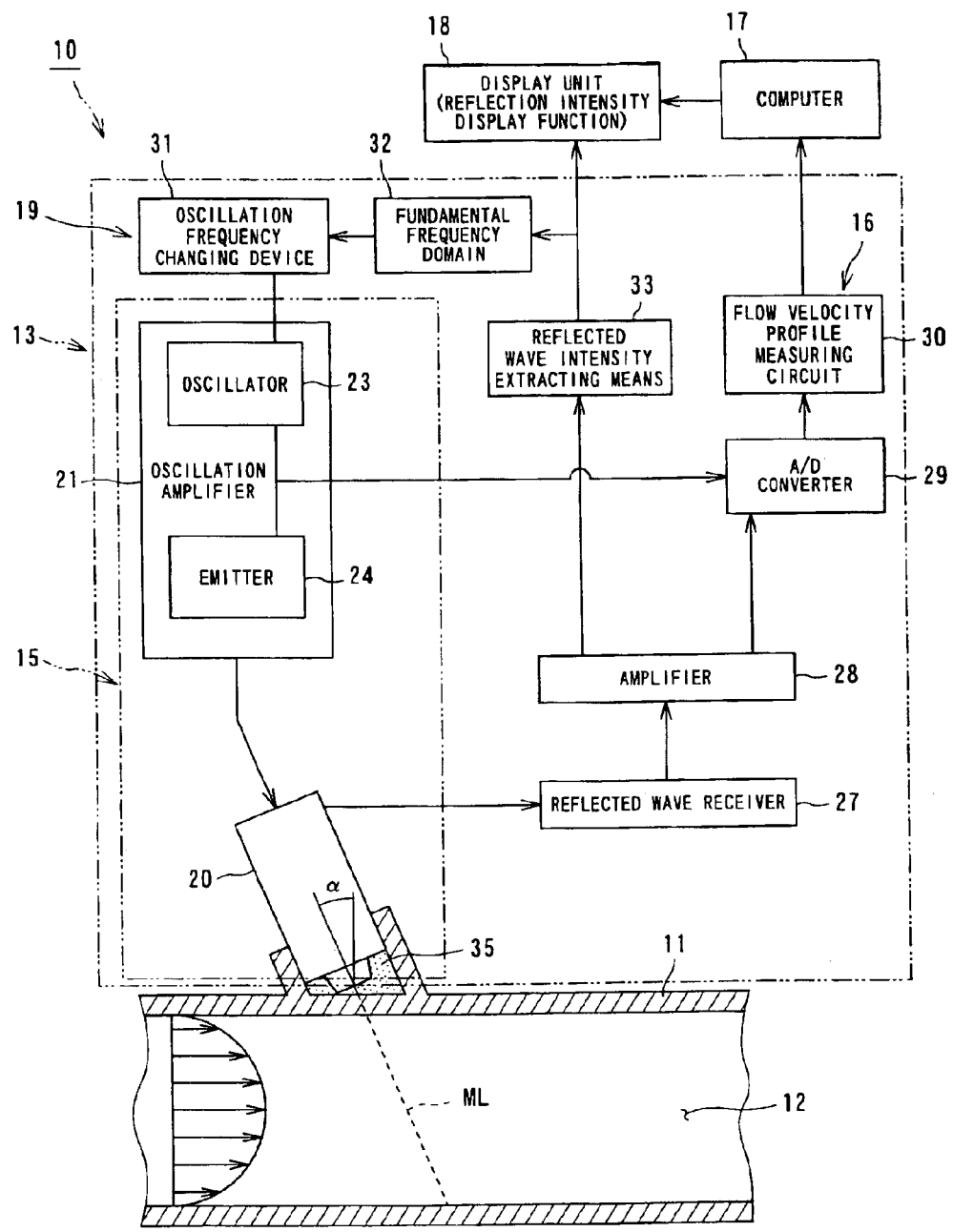
FIG. 1 is a diagram showing a first embodiment of a Doppler type ultrasonic flowmeter in accordance with the present invention.

FIG. 1 is a diagram showing a first embodiment of the Doppler type ultrasonic flowmeter in accordance with the present invention. A Doppler type ultrasonic flowmeter 10 measures flow velocity profile of a fluid 12 to be measured, such as a liquid or gas, which is flowing in a fluid pipe 11 so as to perform time-dependent instant measurement of flow rates.

The Doppler type ultrasonic flowmeter 10 is provided with an ultrasonic velocity profile measuring unit (hereinafter referred to as the "UVP unit") 13 for performing contactless measurement of the fluid 12 to be measured that is flowing in the fluid pipe 11. The UVP unit 13 has an ultrasonic transmitting means 15 for transmitting ultrasonic pulses of predetermined frequencies (fundamental frequency of $f_0$) along a measurement line ML to the fluid 12, a fluid velocity profile measuring means 16 for receiving ultrasonic echoes of ultrasonic pulses entering the fluid 12, the echoes being the reflected waves from a measurement region, to measure the flow velocity profile of the fluid 12 in the measurement region, a computer 17, such as a microcomputer, a CPU, or MPU, functioning as a fluid flow rate computing means for performing arithmetic processing based on the flow velocity profile of the fluid 12 to be measured to perform integration in a radial direction so as to determine the flow rate of the fluid 12 in a time-dependent manner, a display device 18 allowing outputs from the computer 17 to be displayed in a time-series manner, and a frequency selecting and setting means 19 for automatically selecting an ultrasonic wave of an optimum frequency for the fluid 12 that is flowing in the fluid pipe 11.

The ultrasonic transmitting means 15 has an ultrasonic transducer 20 for emitting ultrasonic pulses of required frequencies, and an oscillation amplifier 21 serving as a signal generator for oscillating the ultrasonic transducer 20. The oscillation amplifier 21 is equipped with an oscillator 23 for generating electrical signals of predetermined fundamental frequency $f_0$ and an emitter 24 (frequency $F_{rpf}$) for outputting electrical signals in the form of pulses from the oscillator 23 at predetermined time intervals ($1/F_{rpf}$). The pulse electrical signals of the desired fundamental frequencies $f_0$ are input (inputted) from the oscillation amplifier 21 serving as the signal generator to the ultrasonic transducer 20.

Upon the application of a pulse electrical signal to the ultrasonic transducer 20, an ultrasonic pulse of the fundamental frequency $f_0$ is emitted along the measurement line ML. The ultrasonic pulse is, for example, a linear beam that has a pulse width of about 5 mm and hardly spreads.

The ultrasonic transducer 20 serves also as a transmitter-receiver, and the ultrasonic transducer 20 is adapted to receive ultrasonic echoes of emitted ultrasonic pulses that are reflected by reflectors in the fluid. The reflectors are air bubbles evenly contained in the fluid 12 to be measured, particles of metal fine powder or the like, or foreign objects having different acoustic impedance from that of the fluid 12.

Ultrasonic echoes received by the ultrasonic transducer 20 are received by a reflected wave receiver 27 and converted into echo electrical signals by the reflected wave receiver 27. The echo electrical signals are amplified by an amplifier 28, and then subjected to digitization through an A/D converter 29, and the digital echo signals are supplied to a flow velocity profile measuring circuit 30 constituting the flow velocity profile measuring means. The flow velocity profile measuring circuit 30 receives a digitized electrical signal of the fundamental frequency $f_0$ from the oscillation amplifier 21 to measure changes in the flow velocity on the basis of the Doppler shift from the difference in frequency between the two signals and calculates the flow velocity profile in the measurement region along the measurement line ML. Calibration of the flow velocity profile in the measurement region by a tilt angle α makes it possible to measure the flow velocity profile in the cross section of the fluid pipe 11.

Meanwhile, as the fundamental frequency $f_0$ of an ultrasonic pulse emitted from the ultrasonic transducer 20, an optimum value is selected with respect to the wall thickness of the fluid pipe 11 by the frequency selecting and setting means 19 so as to develop a resonant transmission phenomenon. It has been found that the metal wall transmission characteristic of ultrasonic waves is extremely marked when the wall thickness of the fluid pipe 11 is the half or an integral multiple of the fundamental frequency $f_0$ of ultrasonic wave.

Based on this finding, the Doppler type ultrasonic flowmeter 10 incorporates the frequency selecting and setting means 19 that permits free and automatic selection of the required fundamental frequencies $f_0$ that cause various types of fluid pipes 11 to develop the resonant transmission phenomenon without changing the thickness of the pipe wall of the fluid pipe 11.

The frequency selecting and setting means 19 has an oscillation amplifier 21 for causing the ultrasonic transducer to emit ultrasonic waves of desired oscillation frequencies (fundamental frequencies $f_0$), an oscillation frequency changing device 31 that variably adjusts and sets the oscillation frequencies of the oscillation amplifier 21, a fundamental frequency domain setting means 32 for operating the oscillation frequency changing device 31 within a range designated beforehand for the oscillation frequency changing device 31, for example, in a frequency domain of 200 kHz to 4 MHz, a reflected wave receiver 27 as the ultrasonic receiving means for receiving ultrasonic echoes reflected from a measurement region in the fluid pipe 11, a reflected wave intensity extracting means 33, provided with a memory for the intensities of the city that amplifies received ultrasonic echo signals by an amplifier 28, then extracts the intensities of the ultrasonic echo signals and stores them in a memory provided for the means 33, and a display device 18 equipped with a reflected wave intensity displaying function on which reflected intensities (ultrasonic echo intensities) extracted and stored by the reflected wave intensity extracting means 33 are displayed.

Thus, the frequency selecting and setting means 19 oscillates the ultrasonic transducer 20 by the oscillation amplifier 21 to emit ultrasonic pulses. The oscillation frequencies $f_0$ of the oscillation amplifier 21 are decided on the basis of the output (outputted) signals of the oscillation frequency changing device 31. The oscillation frequency changing device 31 variably sets the oscillation frequencies of the oscillation amplifier 21 in the frequency domain decided beforehand by the fundamental frequency domain setting means 32.

The frequency selecting and setting means 19 repeatedly performs extraction and selection of ultrasonic oscillation frequencies by the cooperative action of the reflected wave intensity extracting means 33, the oscillation frequency changing device 31, etc., and automatically selects and sets an optimum ultrasonic frequency with respect to the wall thickness of the fluid pipe 11 that causes the resonant transmission phenomenon.

When an optimum ultrasonic frequency is selected and set, an oscillation frequency of the oscillation amplifier 21 is decided on the basis of an output signal from the oscillation frequency changing device 31. The ultrasonic transducer 20 is oscillated by the oscillation amplifier 21 to emit an ultrasonic pulse of the desired fundamental frequency $f_0$, which is the optimum frequency, into the fluid pipe 11.

Since the ultrasonic pulse of the optimum frequency is emitted from the ultrasonic transducer 20, an adequately reflected wave S/N ratio can be secured, and a large signal of the ultrasonic echo, which is the reflected wave, can be obtained. In order to secure the large ultrasonic echo signal, it is important to select the fundamental frequency $f_0$ of an ultrasonic wave that causes the resonant transmission phenomenon to take place with respect to the wall thickness of the fluid pipe 11 (the wall thickness in the measurement line ML direction).

Setting the wall thickness of the fluid pipe 11 to an integral multiple of the half-wave length of an ultrasonic wave causes the ultrasonic transmittance in the interface of the fluid pipe 11 to markedly increase due to resonant effect. As a result of the increased ultrasonic transmittance, the ultrasonic echo signal, which is the reflected wave from reflectors in the fluid to be measured 12, is enlarged.

Accordingly, if a fundamental frequency $f_0$ that is optimum for the wall thickness of the fluid pipe 11 is selected by the frequency selecting and setting means 19 as the oscillation frequency of the ultrasonic pulse to be emitted from the ultrasonic transducer 20, then attenuation in an ultrasonic path (travel path in the measurement line ML direction) decreases, while the ultrasonic transmittance in the interface of the fluid pipe 11 increases, thus making it possible to obtain adequate intensity of reflected waves.

In FIG. 1, reference numeral 35 denotes a contact medium for making it easy for ultrasonic waves emitted from the ultrasonic transducer 20 to smoothly enter into the fluid pipe 11. The contact medium 35 is provided to ensure good acoustic switching by reducing acoustic impedance emitted from the ultrasonic transducer 20 into the fluid pipe 11.

In the first embodiment, the ultrasonic echoes, which are reflected waves of ultrasonic pulses, have been received by the reflected wave receiver 27. However, it is not always necessary to independently locate the reflected wave receiver 27, and the reflected wave receiver may alternatively be incorporated in the receiving function of the ultrasonic transducer 20.

Referring now to FIGS. 2 (2A, 2B and 2C), the working principle of the Doppler type ultrasonic flowmeter 10 will be explained.

Figure 2A:
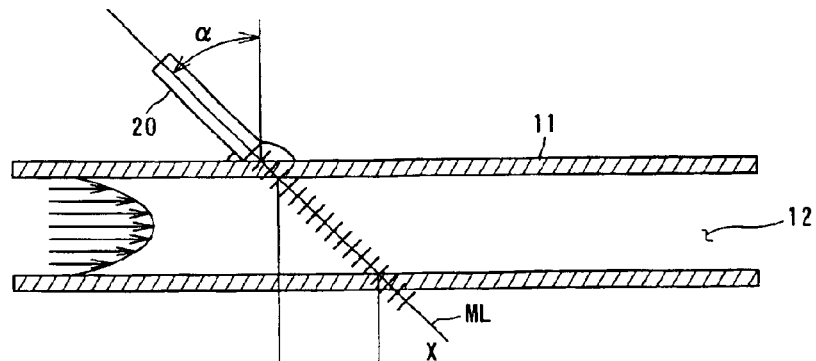
FIG. 2 is a diagram for explaining a principle of an operation in flow rate measurement by the Doppler type ultrasonic flowmeter in accordance with the present invention.
Figure 2B:
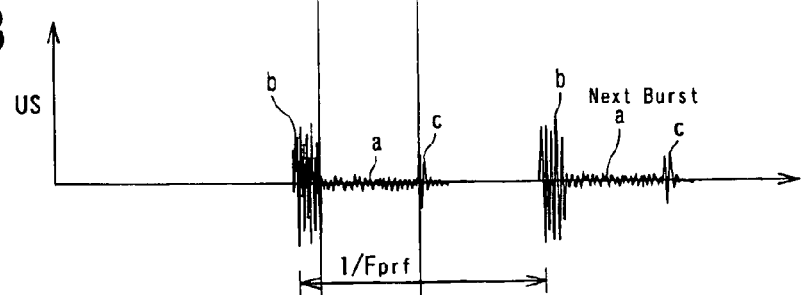

As shown in FIG. 2A, when an ultrasonic pulse having the desired fundamental frequency $f_0$ is emitted from the ultrasonic transducer 20, with the ultrasonic transducer 20 being installed at an angle α in the direction in which a fluid to be measured flows with respect to the radial direction of the fluid pipe 11, the ultrasonic pulse is reflected by reflectors, such as air bubbles or foreign matters, evenly distributed in the fluid 12 to be measured on the measurement line ML and then returned to the ultrasonic transducer 20 in the form of an ultrasonic echo a, which is a reflected wave, as shown in FIG. 2B. Reference character b in FIG. 2B denotes a multiplex reflected echo that is reflected by the pipe wall on the side where the ultrasonic pulse enters, and reference character c denotes a multiplex reflected echo that is reflected by the pipe wall at the opposite side. The emitting interval of ultrasonic pulses emitted from the ultrasonic transducer 20 is $1/F_{rpf}$.

Figure 2C:
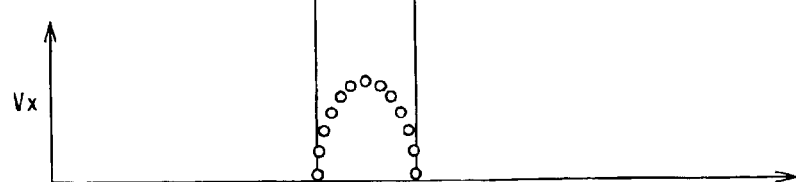

The echo signal emitted by the ultrasonic transducer 20 is subjected to filtering treatment, and the flow velocity profile along the measurement line ML is measured by using the Doppler shift method. The measurement result is shown in FIG. 2C. The flow velocity profile can be measured by the fluid velocity profile measuring means 16 of the UVP unit 13.

The Doppler shift method applies the principle in which an ultrasonic pulse emitted into the fluid 12 flowing in the fluid pipe 11 is reflected by reflectors mixed or evenly distributed in the fluid 12 and turns into an ultrasonic echo, the frequency of the ultrasonic echo being shifted by the magnitude proportional to flow velocity.

A flow velocity profile signal of the fluid 12, which is measured by the ultrasonic fluid velocity profile measuring means 16, is sent to the computer 17 serving as the fluid flow rate computing means wherein the flow velocity profile signal is integrated in the radial direction of the fluid pipe 11 so as to time-dependently determine the flow rate of the fluid 12 to be measured. If the flow rate at the time t of the fluid to be measured 12 is denoted by m(t), then the flow rate can be represented by an expression given below:

$$m(t) = p \int v(x \cdot t) \cdot dA \quad (1)$$

where p: Density of flow rate to be measured,
v(x·t): Velocity component at time t (x direction).

From expression (1), the flow rate m(t) at the time t in the fluid pipe 11 can be rewritten to an expression given below:

$$m(t) = p \iint vx(r \cdot \theta \cdot t) \cdot r \cdot dr \cdot d\theta \quad (2)$$

where vx(r·θ·t): Velocity component in the direction of the pipe axis at angle θ and distance r from the center on the cross section of the pipe at the time t.

From this expression (2), the Doppler type ultrasonic flowmeter 10 is capable of obtaining the space profile of a flow of the fluid to be measured 12 instantly at a response speed of, for example, about 50 msec to about 100 msec. The flow of the fluid 12 in the fluid pipe (round pipe) 11 has a three-dimensional profile in an unsteady state if an adequate runup zone cannot be secured or temporal fluctuation is present due to opening/closing of a valve or start/stop of a pump. The Doppler type ultrasonic flowmeter 10, however, allows a flow velocity profile in a measurement region to be time-dependently determined at once, so that the flow rate of the fluid 12 to be measured can be precisely determined with high accuracy independently of whether the flow is in a steady or unsteady state.

Furthermore, a confirmatory test on the transmission characteristics of ultrasonic waves emitted from the ultrasonic transducer 20 was conducted by using the Doppler type ultrasonic flowmeter 10 in accordance with the present invention.

Figure 3:
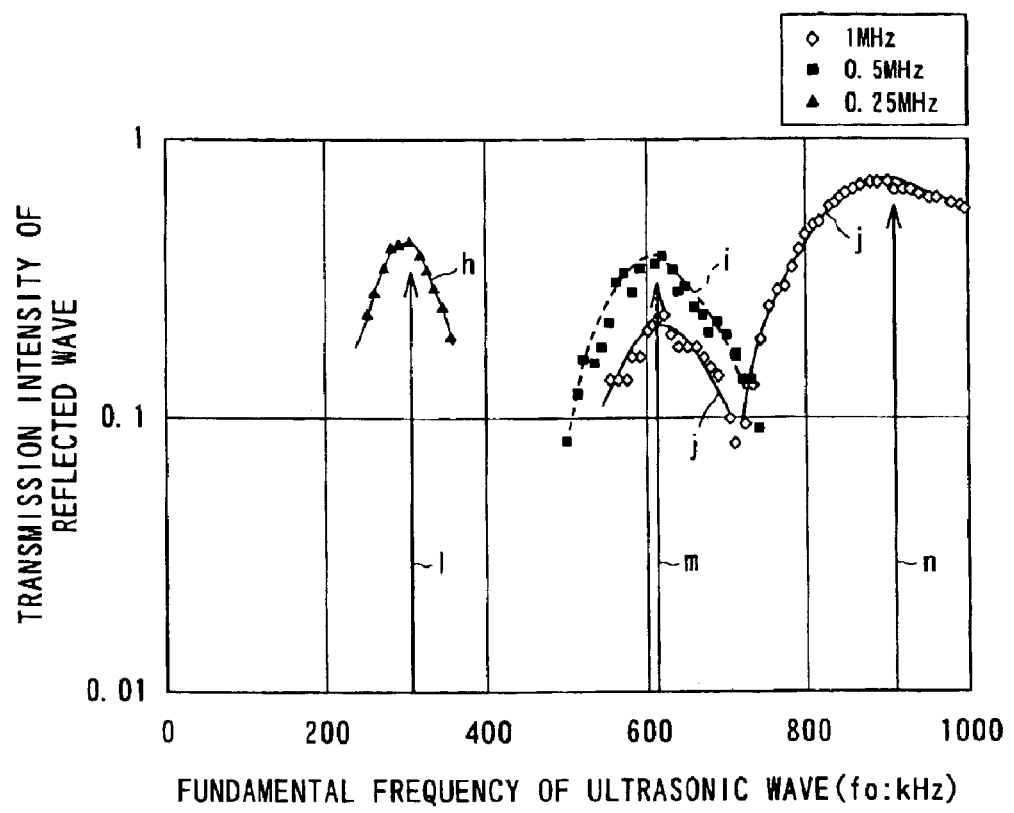
FIG. 3 is a diagram showing metal wall surface transmission characteristics of ultrasonic waves.

FIG. 3 shows test results showing the wall surface transmission characteristics of the ultrasonic waves.

The Doppler type ultrasonic flowmeter 10 used for this test was adapted to be able to automatically adjust and set the fundamental frequencies of the ultrasonic waves emitted from the ultrasonic transducer 20 in, for example, units of 5 kHz from 200 kHz to a few MHz, e.g., 2 MHz, by the frequency selecting and setting means 19.

In order to carry out the test on the wall surface transmission of ultrasonic waves, stainless steel was embedded in a portion of an acrylic pipe having a diameter of 250 mmφ, and the ultrasonic transducer 20 was installed on the outer portion of the stainless steel wall. Ultrasonic waves were emitted, and the reflection intensity of the ultrasonic waves from an opposing wall surface of the acrylic pipe was checked at different fundamental frequencies. Reflected wave transmission intensity curves h, i and j obtained when the fundamental frequency was changed in the units of 5 kHz are shown.

For the test on the wall surface transmission of the ultrasonic waves, three different wall thicknesses, 9.5 mm, 11.5 mm, and 13 mm, of stainless wall were used. FIG. 3 shows the example of the ultrasonic wave wall surface transmission test using the stainless steel wall thickness of 9.5 mm. The axis of abscissa indicates the fundamental frequency $f_0$ of ultrasonic waves, while the axis of ordinates indicates the reflection intensity of ultrasonic waves from the opposing wall. The characteristic frequencies of the three types of the ultrasonic transducers used are 0.25 MHz, 0.5 MHz and 1 MHz, the transmission intensity curves thereof being denoted by reference characters h, i and j.

In FIG. 3, arrows 1, m, and n denote the relationships between the oscillation frequency wavelengths of ultrasonic waves and the stainless steel wall thicknesses, and indicate the positions of the frequencies of ½-fold, 1-fold, and 3/2-fold stainless steel wall thicknesses, beginning with a lowest ultrasonic wavelength.

Based on FIG. 3, it is understood that, if, for example, a 1-MHz ultrasonic transducer is used, then good transmission characteristic of ultrasonic waves is obtained when the flow rate measurement is performed by setting the fundamental frequency to approximately 910 kHz according to the wall thickness of a stainless steel pipe. It is seen that the frequency transmission intensity curve j shows a high transmission intensity level of reflected waves at the position indicated by the arrow n.

Based now on the transmission characteristics of the ultrasonic waves shown in FIG. 3, a fluid pipe made of carbon steel (internal diameter of 150 mm) having a wall thickness of 9.5 mm was prepared, the ultrasonic transducer

20 of 1-MHz characteristic frequency was used, and the fundamental frequency $f_0$ emitted from the ultrasonic transducer 20 was selected and set to 910 kHz by the frequency selecting and setting means 19 to measure the flow velocity profile of the fluid to be measured.

Figure 4:
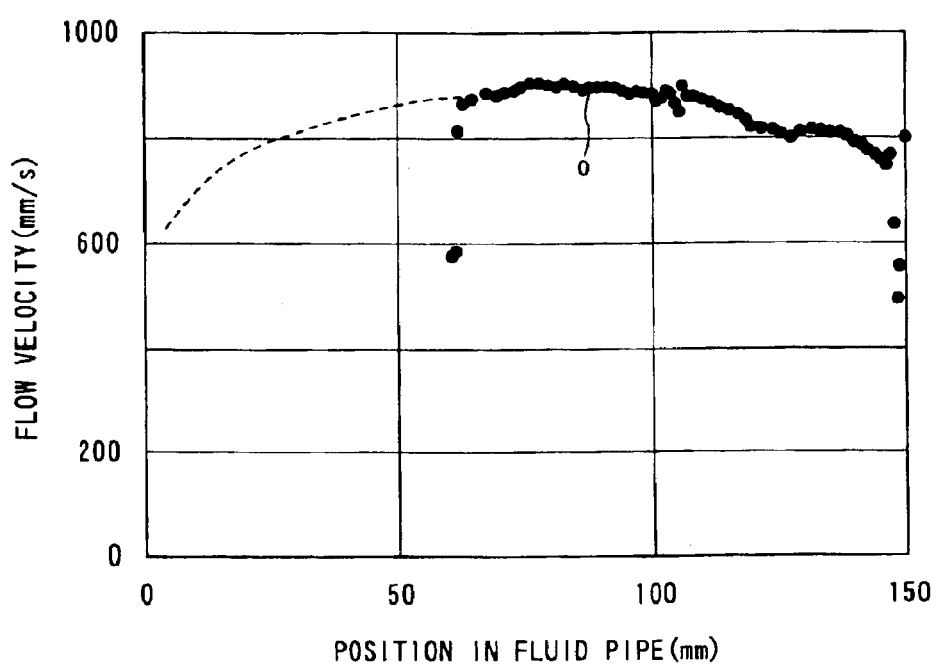
FIG. 4 is a diagram showing average flow velocity profile of a fluid to be measured that is flowing in a fluid pipe.

The results of the temporal average flow velocity profile of the fluid to be measured obtained by the measurement test are shown in FIG. 4. The measurement points of the flow velocity profile of the fluid ranged from 60 mm to 150 mm. On the side before the pipe central portion (range of 0 mm to 60 mm) of the fluid pipe made of carbon steel, the reflection of ultrasonic waves in the wall made it difficult to obtain an adequate flow velocity profile. In the measurement region on the side beyond the pipe central portion, however, the wall surface did not affect the flow velocity profile of the fluid 12 to be measured, allowing a relatively smooth average flow velocity profile curve "O" to be obtained.

Based on the average flow velocity profile curve "O", the average flow velocity profile is integrated in the fluid pipe 11 so as to make it possible to perform accurate, contactless measurement of the flow rate of the fluid 12 flowing in the fluid pipe 11.

Figure 5:
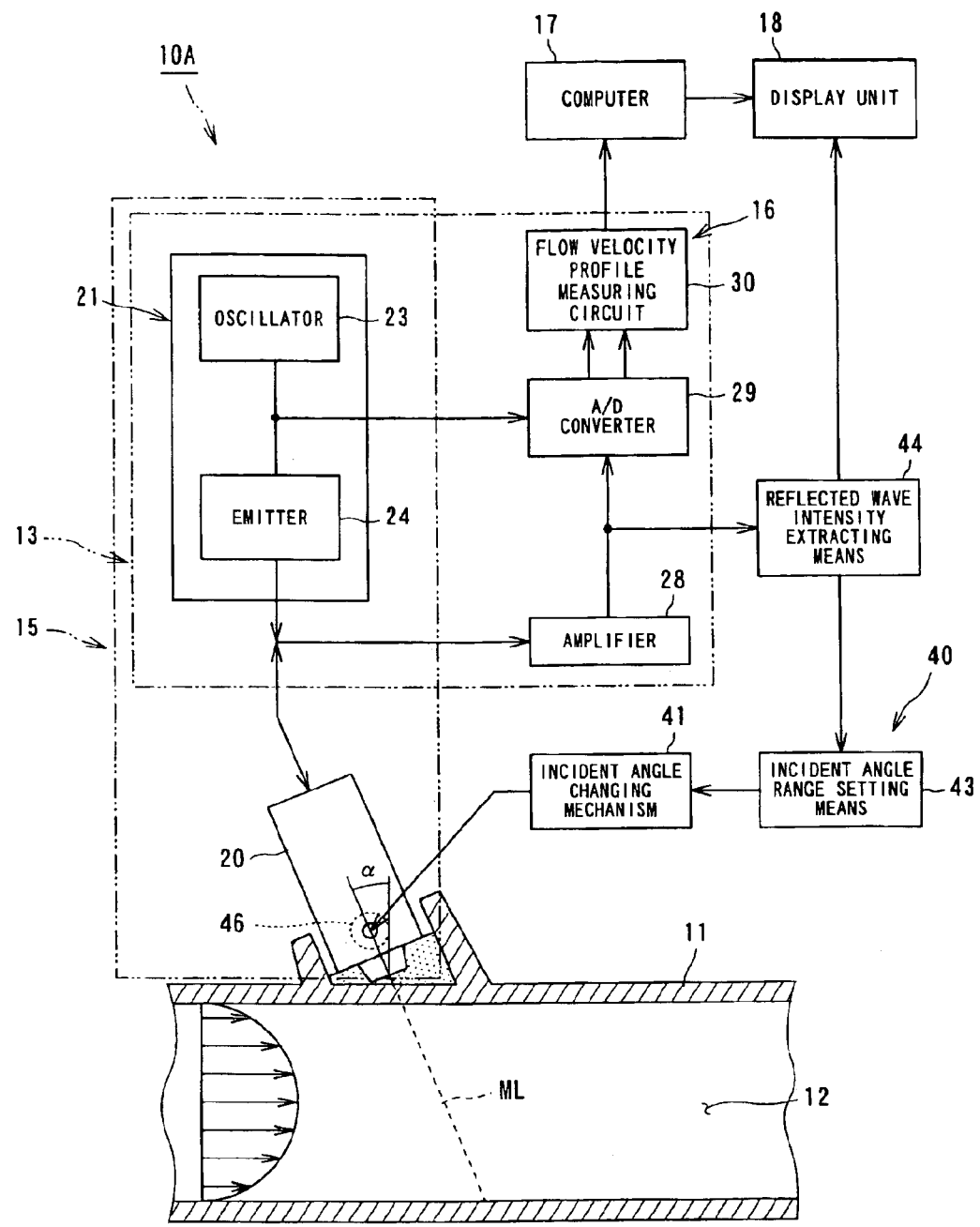
FIG. 5 is a diagram showing a second embodiment of the Doppler type ultrasonic flowmeter in accordance with the present invention.

FIG. 5 shows a second embodiment of the Doppler type ultrasonic flowmeter in accordance with the present invention.

A Doppler type ultrasonic flowmeter 10A shown in this embodiment may be adapted to change the wall thickness of a fluid pipe 11 to induce the resonant transmission phenomenon as a method to improve the S/N ratio of reflected waves in place of selecting an optimum frequency of an ultrasonic pulse entering the fluid pipe 11.

However, since it is actually impossible to change the wall thickness of the fluid pipe 11, a means equivalent to changing the wall thickness of the fluid pipe 11 has been provided by changing the mounting angle of an ultrasonic transducer 20.

In the second embodiment, an incident angle α of the ultrasonic pulses emitted from the ultrasonic transducer 20 is adjusted and set by an incident angle adjusting and setting means 40 thereby to automatically select the incident angle of an ultrasonic wave which corresponds to the wall thickness of the fluid pipe 11. The like reference numerals are added to the members corresponding to those of the Doppler type ultrasonic flowmeter 10 described with reference to the first embodiment assigned by the same reference numerals, and the explanation thereof will be omitted herein.

The Doppler type ultrasonic flowmeter 10A shown in FIG. 5 is provided with the incident angle adjusting and setting means 40 in place of the frequency selecting and setting means 19.

The incident angle adjusting and setting means 40 is equipped with an ultrasonic transducer 20 provided on the fluid pipe 11 from outside in a manner that its mounting angle can be adjusted, an incident angle changing mechanism 41 capable of adjusting and setting an incident angle α of an ultrasonic pulse emitted from the ultrasonic transducer 20, an incident angle range setting means 43 for actuating the incident angle changing mechanism 41 in an incident angle range designated beforehand, e.g., the incident angle α can be changed within a range of angle scope width of 5 degrees to 45 degrees, and a reflected wave intensity extracting means 44 which receives an ultrasonic echo reflected from a measurement region in the fluid pipe 11 and then extracts and stores the intensity of the ultrasonic echo. The ultrasonic echo intensity extracted and stored by the reflected wave intensity extracting means 44 is then displayed on a display unit 18 provided with a reflected wave intensity display function.

The incident angle adjusting and setting means 40 is a mechanism for causing the incident angle changing mechanism 41 to change the incident angle α of the ultrasonic waves in a range of about 5 degrees to about 45 degrees. Based on an output signal issued from the incident angle changing mechanism 41, the mounting angle of the ultrasonic transducer 20 is automatically adjusted and set to an optimum value. The mounting angle of the ultrasonic transducer 20 is variably adjusted and set by driving a mounting angle changing and adjusting mechanism, such as a stepping motor 46 or the like, by an output signal issued from the incident angle changing mechanism 41.

The incident angle α of the ultrasonic wave emitted from the ultrasonic transducer 20 is the angle formed with respect to a perpendicular line or a perpendicular surface of the pipe surface of the fluid pipe 11. The incident angle of the ultrasonic pulses emitted from the ultrasonic transducer 20 are set to optimum angles by the incident angle adjusting and setting means 40 with respect to the wall thickness of the fluid pipe 11 so as to cause a resonant transmission phenomenon to take place.

The incident angle adjusting and setting means 40 changes the incident angles of the ultrasonic pulses emitted from the ultrasonic transducer 20 in an angle range of the incident angles from about 5 degrees to about 45 degrees by the output signals from the incident angle changing mechanism 41 and the reflected wave intensities are extracted and stored by the reflected wave intensity extracting means 44. The reflected wave intensities stored by the reflected wave intensity extracting means 44 are displayed by the display unit 18, while an operation of extracting and selecting the incident angles of the ultrasonic pulses is repeatedly performed by the incident angle adjusting and setting means 40 to automatically select and adopt the optimum incident angles of the ultrasonic pulses.

Adjusting and setting of the incident angles of the ultrasonic pulses emitted from the ultrasonic transducer 20 to optimum angles by the incident angle adjusting and setting means 40 will become equivalent to the physical change of the wall thickness of the fluid pipe 11, and the ultrasonic pulses emitted from the ultrasonic transducer 20 make it possible to perform precise and accurate measurement of the flow velocity profile and the flow rate of the fluid 12 to be measured flowing in the fluid pipe 11.

The propagation distances in materials, that is, the propagation distances of the ultrasonic waves in the fluid pipe 11, are changed by changing the incident angles (entering angles) of ultrasonic waves emitted from the ultrasonic transducer 20. Furthermore, the setting of the propagation distances of the ultrasonic waves to the integral multiples of half-wave lengths of ultrasonic waves causes the resonant transmission phenomenon to take place with respect to the wall thickness of the fluid pipe 11. This makes it possible to secure an adequate reflected wave S/N ratio, allowing the intensity of an ultrasonic echo, which is a reflected wave, to be secured. Hence, the flow velocity profiles and flow rates of fluids to be measured flowing in the fluid pipe 11 can be measured accurately and contactlessly.

In each of the described embodiments of the Doppler type ultrasonic flowmeter, there are shown the example equipped with the frequency selecting and setting means 19 and the example equipped with the incident angle adjusting and setting means 40 have been shown. Alternatively, however, in a single Doppler type ultrasonic flowmeter, the frequency selecting and setting means 19 and the incident angle adjusting and setting means 40 may be combined. The Doppler type ultrasonic flowmeter equipped with the combination of the two setting means 19 and 40 permits easy automatic selection and setting of optimum frequencies and optimum incident angles.

The Doppler type ultrasonic flowmeters 10 and 10A shown in FIG. 1 to FIG. 4 are adapted to measure the flow rates of fluids to be measured by the linear measurement method of flow velocity profiles, which utilizes the ultrasonic pulse and the ultrasonic echo Doppler shifts. Accordingly, in order to improve measurement accuracy, the number of measurement lines ML and the number of ultrasonic transducers 20 to be installed must be increased. In practice, an N number of the ultrasonic transducers 20 will be required to be installed in predetermined intervals in the circumferential direction of the pipe 11, and the measurement lines ML are set at an angle α with respect to the normal to the pipe wall so that all the measurement lines ML pass the axis of the pipe 11.

Accordingly, if the flow of the fluid 12 passing in the pipe 11 is flowing in the direction of the pipe axis and a flow $v_r$ in the radial direction and a flow $v_\theta$ at an angle θ can be ignored, then $v_x \gg v_r$, $v_x \gg v_\theta$. the flow rate measurement will be simplified and represented by an expression given below:

$$m(t) = \sum_{i}^{N} \cdot \frac{2\pi}{N} \int_{-R}^{R} \{vx(r \cdot \theta i \cdot t)/\sin\alpha\} \cdot r \cdot dr \qquad (3)$$

Thus, the determined flow rate of the fluid 12 can be instantly displayed by the display unit 18 in the time-dependent manner. The display unit 18 is also capable of displaying the flow velocity profiles along the measurement lines ML of the fluid 12 in the fluid pipe 11 or the flow velocity profiles in the cross section of the pipes.

Figure 6:
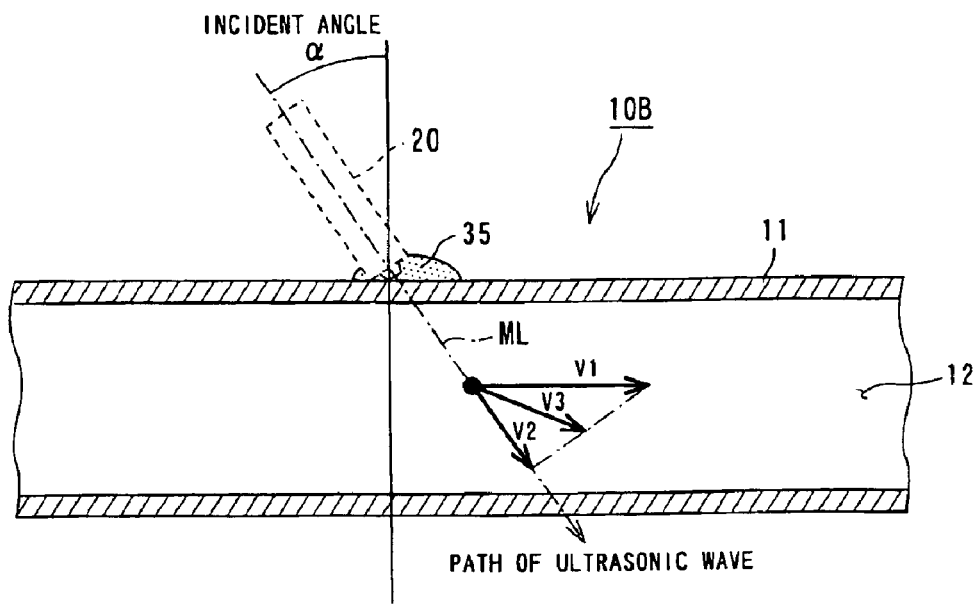
FIG. 6 is an image diagram showing velocity components in an ultrasonic incident angle direction calculated on the basis of Doppler frequencies, which is used to explain a third embodiment of the Doppler type ultrasonic flowmeter in accordance with the present invention.
Figure 7:
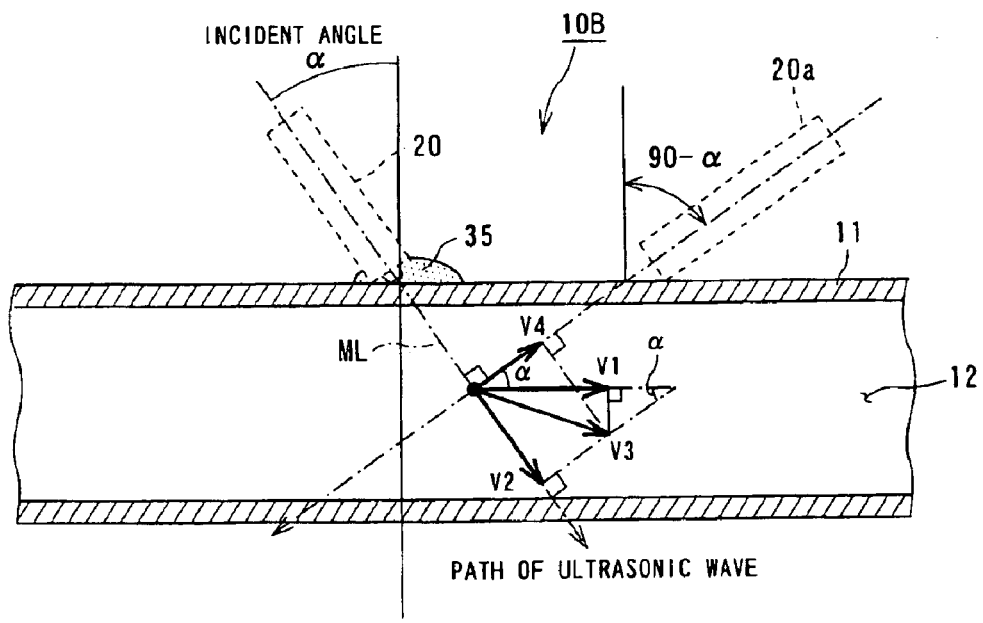
FIG. 7 is a figure of principle illustrating the third embodiment of the Doppler type ultrasonic flowmeter in accordance with the present invention.
Figure 8:
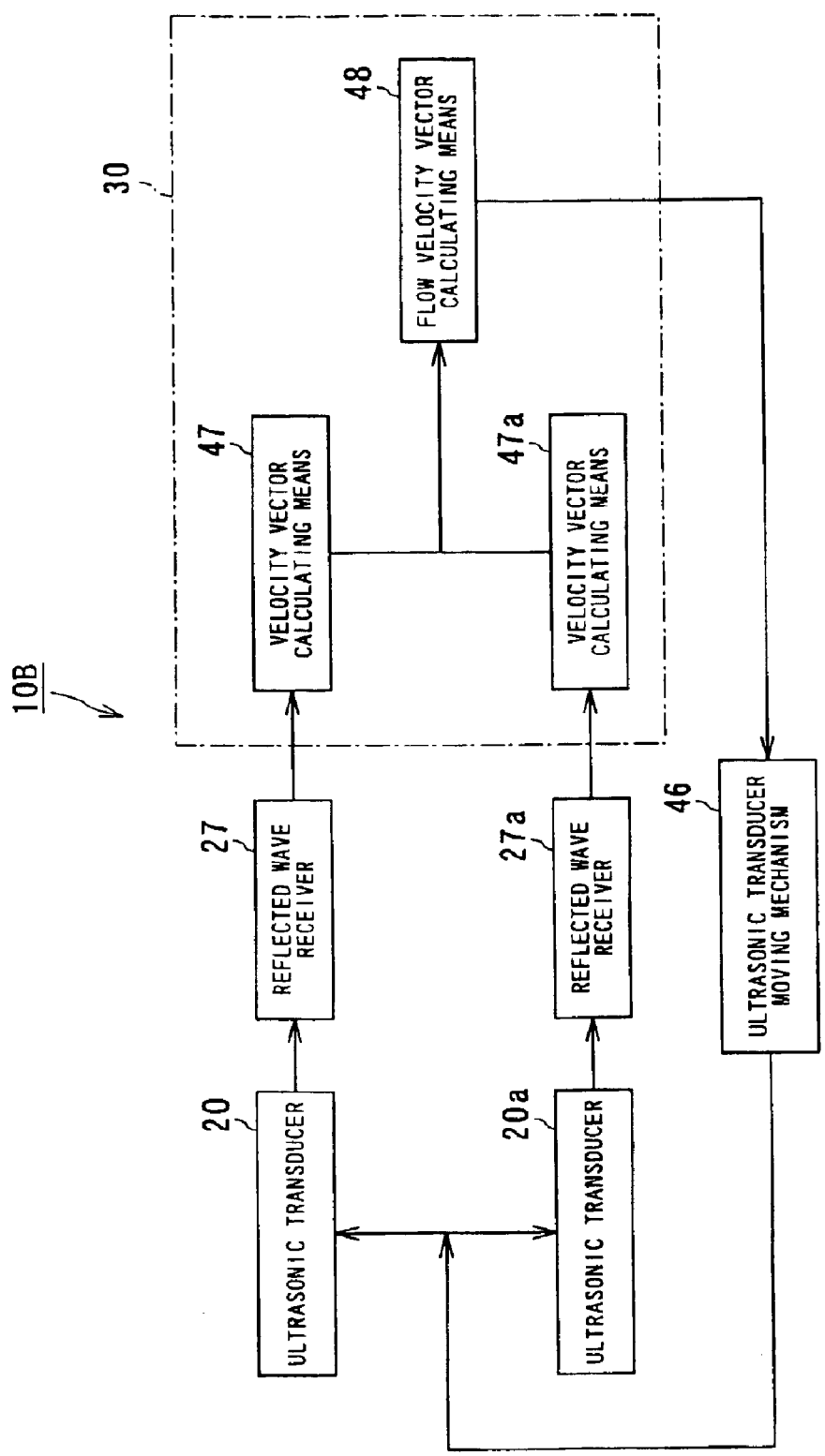
FIG. 8 is a signal processing block diagram showing the third embodiment of the Doppler type ultrasonic flowmeter in accordance with the present invention.

FIG. 6 to FIG. 8 show a third embodiment of the Doppler type ultrasonic flowmeter in accordance with the present invention.

As illustrated in FIG. 6, a Doppler type ultrasonic flowmeter 10B of this embodiment calculates, on the basis of a Doppler frequency, a velocity component V2 in the direction of an ultrasonic wave incident angle (entering angle) of a fluid 12 to be measured which is flowing in a fluid pipe 11. From the calculated Doppler frequency, the flow velocity profile along a measurement line ML is determined according to a linear measurement method so as to calculate the flow rate of the fluid 12.

The Doppler type ultrasonic flowmeter 10B calculates the velocity vector V2 in the direction of an ultrasonic path (the measurement line ML) from the Doppler frequency and divides the velocity vector V2 by sin α so as to calculate the velocity vector V1 in the axial direction of the fluid pipe 11.

The Doppler type ultrasonic flowmeter 10B cannot calculate correct flow velocities if the flow of the fluid 12 to be measured is not parallel to the fluid pipe 11 and a swirling flow is present in the fluid pipe 11 or a non-parallel flow is present in the fluid pipe 11. For example, as shown in FIG. 7, if there is an air bubble having a velocity vector V3, the velocity vector V3 then shares the velocity vector V2 in the same direction as that of the velocity vector V1 of the fluid 12, so that the flowmeter erroneously calculates the apparent velocity of the air bubble in the fluid 12 as the large velocity in the axial direction of the fluid pipe 11.

In order to solve the problem of calculating the flow rates based on the apparent velocities, the Doppler ultrasonic flowmeter 10B is provided with two ultrasonic transducers 20 and 20a mounted on the fluid pipe 11. The one ultrasonic transducer 20 is installed so as to be orthogonal with respect to the other ultrasonic transducer 20a. The two ultrasonic transducers 20 and 20a determine their velocity vectors V2 and V4, and the sum of the velocity vectors V2 and V4 is calculated, thereby making it possible to properly determine the flow velocity of the fluid 12 to be measured and the flow velocity of the air bubble.

In the Doppler type ultrasonic flowmeter 10B, the other ultrasonic transducer 20a is configured to be movable on the fluid pipe 11 in relation to the one ultrasonic transducer 20 in order to properly measure the flow velocity of the fluid 12.

Hence, the Doppler type ultrasonic flowmeter 10B is equipped with an ultrasonic transducer moving mechanism 46 for relatively moving the other ultrasonic transducer 20a towards or backward with respect to the one ultrasonic transducer 20 and is configured as illustrated in the signal processing block diagram shown in FIG. 8.

In the Doppler type ultrasonic flowmeter 10B shown in FIG. 8, the two ultrasonic transducers 20 and 20a are disposed such that the incident directions of the ultrasonic pulses emitted from the two ultrasonic transducers 20 and 20a are orthogonalized with each other in the fluid pipe 11. More specifically, in the Doppler type ultrasonic flowmeter 10B, the two ultrasonic transducers 20 and 20a are disposed such that the ultrasonic pulses emitted from the two ultrasonic transducers 20 and 20a are orthogonalized in a measurement region in the fluid pipe 11.

The Doppler type ultrasonic flowmeter 10B is equipped with reflected wave receivers 27 and 27a for receiving ultrasonic echoes, which are reflected waves of the ultrasonic pulses emitted from the two ultrasonic transducers 20 and 20a, from a measurement region in the fluid pipe 11, velocity vector calculating means 47 and 47a for calculating the velocity vectors in the directions of the ultrasonic measurement lines from the intensities of the ultrasonic echoes received by the respective reflected wave receivers 27 and 27a, and a flow velocity vector calculating means 48 for calculating the flow velocity vector of a fluid to be measured from the vector sum of the velocity vectors calculated by the respective velocity vector calculating means 47 and 47a, wherein the flow rate of the fluid 12 is calculated from a flow velocity profile in the direction of a measurement line ML in the fluid pipe 11 which is calculated by the flow velocity vector calculating means 48.

The ultrasonic echoes, which are the reflected waves of the ultrasonic pulses emitted from the two ultrasonic transducers 20 and 20a and which are reflected from the measurement region in the fluid pipe 11, are received by the reflected wave receivers 27 and 27a, respectively. The intensity signals of the ultrasonic echoes received by the respective reflected wave receivers 27 and 27a are converted into velocity vectors in the directions of the measurement lines ML (the directions of paths) by the velocity vector calculating means 47 and 47a. The vector sum of the obtained velocity vectors in the directions of paths is calculated by the flow velocity vector calculating means 48 so as to calculate a correct velocity vector of the flow velocity of the fluid 12 to be measured.

The flow rates of the fluid 12 can be determined by configuring the flow velocity profile measuring circuit 30 by using the velocity vector calculating means 47, 47a and the flow velocity vector calculating means 48, or by measuring the flow velocity profile of the fluid 12 to be measured flowing in the fluid pipe 11 along the directions of paths (measurement lines) ML and then performing a computation for integrating the flow velocity profile in the directions of paths of ultrasonic waves.

After the flow velocity at the position of the flow velocity vector calculating means 48 of the flow velocity profile measuring circuit 30 is calculated, the ultrasonic transducer 20 or 20a is moved on the fluid pipe 11 by the ultrasonic transducer moving mechanism 46 to collect data at a next position. The ultrasonic transducers 20 and 20a are moved from one position to another by the ultrasonic transducer moving mechanism 46 to determine the flow velocity profile of the fluid to be measured 12 over a whole area in the directions of paths of the ultrasonic pulses. This allows the flow rate to be precisely determined through the computation.

INDUSTRIAL APPLICABILITY

The Doppler type ultrasonic flowmeter in accordance with the present invention makes it possible to automatically set optimum frequencies and optimum incident angles of the ultrasonic waves with respect to the wall thickness of a fluid pipe which causes a resonant transmission phenomenon to take place, obviates the need for providing an ultrasonic transducer optimum for each type of fluid pipe, features the high versatility, and permits the simple, easy, precise, accurate and contactless measurement of the flow rate of the fluid to be measured that is flowing in the fluid pipe.

Moreover, the Doppler type ultrasonic flowmeter in accordance with the present invention permits the precise and highly accurate measurement of the flow rate of the fluid to be measured by utilizing the Doppler shifts of the ultrasonic waves and also permits the precise and highly accurate measurement even of opaque or translucent fluids, which cannot be measured by optical flow rate measuring means, or the fluids having swirls, vortexes or non-parallel flow in the fluid pipe, thus showing high industrial applicability.

What is claimed is:

1. A Doppler type ultrasonic flowmeter, comprising:
   an ultrasonic transmitting means provided with an ultrasonic transducer for emitting ultrasonic pulses and adapted to direct the ultrasonic pulses from the ultrasonic transducer into a fluid to be measured that is flowing in a fluid pipe;
   a flow velocity profile measuring means for receiving an ultrasonic echo of the ultrasonic pulses entered into the fluid to be measured, said ultrasonic echo being reflected from a measurement region in the fluid pipe and measuring a flow velocity profile of the fluid to be measured in the measurement region;
   a fluid flow rate computing means for calculating the flow rate of the fluid to be measured on the basis of the flow velocity profile of the fluid to be measured; and
   a frequency selecting and setting means for automatically selecting a fundamental frequency of an ultrasonic wave from the ultrasonic transducer that causes a resonant transmission phenomenon to take place with respect to a pipe wall of the fluid pipe,
   wherein said frequency selecting and setting means controls the operation of the ultrasonic transmitting means so that an ultrasonic wave of a selected optimum frequency is emitted from the ultrasonic transducer.

2. The Doppler type ultrasonic flowmeter according to claim 1, wherein said oscillation frequency selecting and setting means automatically adjusts and sets the oscillation frequency of an ultrasonic pulse emitted from the ultrasonic transducer so that an integral multiple of an ultrasonic wave half-wave length is equal to the wall thickness of the fluid pipe.

3. The Doppler type ultrasonic flowmeter according to claim 1, wherein said oscillation frequency selecting and setting means comprises an oscillation amplifier for emitting an ultrasonic wave of a required oscillation frequency from the ultrasonic transducer, an oscillation frequency changing device for variably adjusting and setting an oscillation frequency of the oscillation amplifier, a frequency domain setting means for operating the oscillation frequency changing device in a frequency domain designated beforehand, an ultrasonic receiving means for receiving an ultrasonic echo of the ultrasonic pulse emitted from the ultrasonic transducer that is reflected from the measurement region in the fluid pipe, and a reflected wave intensity extracting means for extracting and storing the intensity of the received ultrasonic echo, and wherein said oscillation frequency selecting and setting means repeats an operation of extracting and selecting oscillation frequencies to automatically select an optimum frequency of an ultrasonic wave.

4. The Doppler type ultrasonic flowmeter according to claim 1, further comprising an incident angle adjusting and setting means for adjusting and setting an incident angle of an ultrasonic pulse emitted from the ultrasonic transducer into the fluid to be measured, wherein the incident angle adjusting and setting means has the ultrasonic transducer provided on the fluid pipe so as to be adjusted and set to provide the ultrasonic pulse with an incident angle that causes the resonant transmission phenomenon to take place with respect to the pipe wall of the fluid pipe, said frequency selecting and setting means and said incident angle adjusting and setting means being combined.

5. A Doppler type ultrasonic flowmeter comprising:
   an ultrasonic transmitting means provided with an ultrasonic transducer emitting ultrasonic pulses and adapted to direct ultrasonic pulses from the ultrasonic transducer into a fluid to be measured that is flowing in a fluid pipe;
   a fluid velocity profile measuring means for receiving an ultrasonic echo of the ultrasonic pulses entered into the fluid to be measured that is reflected from the measurement region in the fluid pipe and measuring a flow velocity profile of the fluid to be measured in the measurement region;
   a fluid flow rate computing means for calculating the flow rate of the fluid to be measured on the basis of the flow velocity profile of the fluid to be measured; and
   an incident angle adjusting and setting means for adjusting and setting the incident angle of an ultrasonic pulse from the ultrasonic transducer into the fluid to be measured, wherein said incident angle adjusting and setting means has the ultrasonic transducer provided on the fluid pipe so as to be adjusted and set to provide the ultrasonic pulse with an incident angle that causes the resonant transmission phenomenon to take place with respect to the pipe wall of the fluid pipe.

6. The Doppler type ultrasonic flowmeter according to claim 5, wherein said incident angle adjusting means comprises an ultrasonic transducer provided on the fluid pipe from an outer side, an incident angle changing mechanism that permits adjustment and setting of the incident angle of an ultrasonic pulse emitted from the ultrasonic transducer, an incident angle range setting means for actuating the incident angle changing mechanism within the range of an incident angle scope designated beforehand, and a reflected wave intensity extracting means for receiving an ultrasonic echo of the ultrasonic pulse emitted from the ultrasonic transducer which is reflected from the measurement region in the fluid pipe, and then extracting and storing the intensity of the ultrasonic echo, wherein said incident angle adjusting and setting means repeatedly perform an operation for extracting and selecting ultrasonic pulse incident angles so to automatically select an optimum ultrasonic pulse incident angle.

7. The Doppler type ultrasonic flowmeter according to claim 5, wherein said ultrasonic transducer is provided on the outer side of the fluid pipe so that the mounting angle thereof is adjusted, and the mounting angle of the ultrasonic transducer is selected by the incident angle changing mechanism so as to adjust and set the incident angle of an ultrasonic pulse emitted from the ultrasonic transducer.

8. A Doppler type ultrasonic flowmeter comprising:

a first ultrasonic transducer provided on a fluid pipe;

a second ultrasonic transducer provided apart from the first ultrasonic transducer in an axial direction of the fluid pipe;

an ultrasonic transducer moving mechanism for relatively moving the first ultrasonic transducer forward or backward with respect to the second ultrasonic transducer, said two ultrasonic transducers being disposed such that emitted ultrasonic pulses are orthogonalized in a measurement region in the fluid pipe;

reflected wave receivers for receiving ultrasonic echoes, which are reflected waves of the ultrasonic pulses emitted from the first and second ultrasonic transducers, respectively, from a measurement region in the fluid pipe;

velocity vector calculating means for calculating velocity vectors in ultrasonic measurement line directions from the intensities of the ultrasonic echoes received by the reflected wave receivers; and a flow velocity vector calculating means for calculating a flow velocity vector of a fluid to be measured from a vector sum of the velocity vectors calculated by the velocity vector calculating means, wherein the flow rate of the fluid to be measured is calculated from the flow velocity profile in the measurement line direction in the fluid pipe calculated by the flow velocity vector calculating means.

* * * * *

UNITED STATES PATENT AND TRADEMARK OFFICE
CERTIFICATE OF CORRECTION

PATENT NO. : 6,931,945 B2  Page 1 of 1
APPLICATION NO. : 10/493480
DATED : August 23, 2005
INVENTOR(S) : Yasushi Takeda et al.

It is certified that error appears in the above-identified patent and that said Letters Patent is hereby corrected as shown below:

On the Title page, item (75) change from
"Yasushi Takeda, 12-21, Kita 8-Jo Nishi 5-chome, Kita-Ku, Sapporo-shi, Hokkaido (JP), 060-0808; Michitsugu Mori, Tokyo (JP)"

to --Yasushi Takeda, 12-21, Kita 8-Jo Nishi 5-chome, Kita-Ku, Sapporo-shi, Hokkaido (JP), 060-0808; Michitsugu Mori, Tokyo (JP); Kenichi Tezuka, c/o The Tokyo Electric Power Company, Incorporated, 1-3, Uchisaiwai-cho, 1-chome, Chiyoda-ku, Tokyo 100-8650 (JP)--

Signed and Sealed this

Eighteenth Day of November, 2008

JON W. DUDAS
*Director of the United States Patent and Trademark Office*